(12) United States Patent
Wrobbel

(10) Patent No.: US 6,318,988 B1
(45) Date of Patent: Nov. 20, 2001

(54) TOOLS FOR PRODUCING SHAPED PARTS WITH CONTOURS

(75) Inventor: Werner Wrobbel, Kupferhammer (DE)

(73) Assignee: Moeller Plast GmbH, Bielefeld (DE)

( * ) Notice: Subject to any disclaimer, the term of this patent is extended or adjusted under 35 U.S.C. 154(b) by 0 days.

(21) Appl. No.: 09/084,555

(22) Filed: May 26, 1998

Related U.S. Application Data

(62) Division of application No. PCT/DE96/02242, filed on Nov. 22, 1996.

(30) Foreign Application Priority Data

Nov. 23, 1995 (DE) ............................................... 195 43 620

(51) Int. Cl.⁷ ................................................. B29C 43/32
(52) U.S. Cl. ...................... 425/346; 425/398; 425/405.1; 425/412; 425/DIG. 58; 425/DIG. 60
(58) Field of Search .................................... 425/349, 346, 425/412, 423, 415.1, DIG. 60, DIG. 58, 398

(56) References Cited

U.S. PATENT DOCUMENTS

| | | | |
|---|---|---|---|
| 4,239,727 | * 12/1980 | Myers et al. | 264/550 |
| 4,252,518 | * 2/1981 | Kiefer | 425/338 |
| 5,032,106 | * 7/1991 | Warburton | 425/292 |
| 5,295,804 | * 3/1994 | Dinnan | 425/182 |
| 5,307,610 | * 5/1994 | Schneider et al. | 53/559 |
| 5,378,416 | * 1/1995 | Kishis et al. | 264/40.5 |
| 5,683,648 | * 11/1997 | Fortin | 264/550 |

FOREIGN PATENT DOCUMENTS

2080721 * 7/1980 (GB) .

* cited by examiner

*Primary Examiner*—Nam Nguyen
*Assistant Examiner*—Emmanuel Luk
(74) *Attorney, Agent, or Firm*—Herbert L. Lerner; Laurence A. Greenberg; Werner H. Stemer

(57) ABSTRACT

The invention relates to a tool which enables articles to be deep-drawn without difficulty, even when the material used is of low elasticity and/or when a decorative sheet is used to produce a composite article. The tool includes a die which has a recessed zone which extends between a die opening and a die contour or an undercut. The recessed zone is delimited on one side at right angles to an end of the die. In order to hold decorative sheet in place, a mounting is fitted on a part of the recessed zone facing the end of the die.

18 Claims, 4 Drawing Sheets

TOOLS FOR PRODUCING SHAPED PARTS WITH CONTOURS

CROSS-REFERENCE TO RELATED APPLICATION

This application is a continuation of International Application Ser. No. PCT/DE96/02242, filed Nov. 22, 1996, which designated the United States.

BACKGROUND OF THE INVENTION

Field of the Invention

The invention relates to a tool for producing shaped parts with contours. The tool includes a female die and an associated male die in-between which a deformable material can be placed. The female die and the male die are disposed so as to be movable individually or jointly toward one another.

Tools of this generic type are known and are used in manifold ways. In the production of shaped parts with relatively complex contours, certain difficulties arise, especially when materials with poor expansion capability are used. For example, when one joins a reinforcement layer (backing) formed of annual plants or fibers to increase the strength or to attain a bonding action with a decorative material, the expandability of the decorative material must not be exceeded or else tearing of the decorative material will ensue during the joining process.

SUMMARY OF THE INVENTION

It is accordingly an object of the invention to provide a tool for producing shaped parts with contours which overcomes the above-mentioned disadvantages of the prior art devices and methods of this general type, and which is used for forming shaped parts having complex contours without destroying the fabric, even if materials with poor expandability are used and/or if decorative material for a composite design is used.

With the foregoing and other objects in view there is provided, in accordance with the invention, a tool for producing shaped parts having contours, including: a female die having an antechamber region, an inlet region and one of a contour and an undercut, the antechamber extends between the inlet region and one of the contour and the undercut; and a male die disposed relative to the female die for producing a shaped part from a deformable material placed between the male die and the female die, the male die and the female die being movable relative to each other.

In accordance with an added feature of the invention, the male die and the female die are disposed to be movable jointly toward one another.

In accordance with an additional feature of the invention, the female die has an end face and the antechamber region is bounded on one side perpendicular to the end face.

In accordance with another feature of the invention, there is a retaining device disposed in the antechamber region for securing a decorative material.

In accordance with a further added feature of the invention, the retaining device is at least one pin.

In accordance with a further additional feature of the invention, the retaining device is disposed on a part of the antechamber region that points toward the end face of the female die.

In accordance with yet another feature of the invention, there is a compulsory guide and the retaining device is guided in the compulsory guide.

In accordance with yet another added feature of the invention, the compulsory guide extends entirely over the antechamber region.

In accordance with yet another additional feature of the invention, the compulsory guide is a longitudinally extending groove.

In accordance with yet another feature of the invention, the retaining device is friction lockingly guided in the compulsory guide for forming a friction lock.

In accordance with an added feature of the invention, a force required to overcome the friction lock is less than a force required to tear the decorative material In accordance with an additional feature of the invention, there is a compression spring disposed in the longitudinally extending groove.

In accordance with another feature of the invention, the antechamber region extends in a recessed fashion relative to the inlet region.

In accordance with yet another further added feature of the invention, the male die has a pressure face which extends in a protruding fashion corresponding to a shape of the antechamber region.

In accordance with yet another further additional feature of the invention, the pressure face is configured for being driven into the antechamber region.

In accordance with yet another feature of the invention, the pressure face has a first edge and the antechamber region has a complementary first edge, and a forced squish edge is produced between the first edge and the complementary first edge for fixation of the deformable material.

In accordance with an added feature of the invention, the first squish edge produces at least one of a pressure-proof and vacuum-proof tool cavity in the deformable material.

In accordance with an additional feature of the invention, the antechamber region has a second edge and a second squish edge can be produced at the second edge by driving the pressure face inward toward the female die.

In accordance with a concomitant feature of the invention, there are interchangeable inserts for varying a configuration of the first squish edge and the second squish edge, the interchangeable inserts can be disposed on at least one of the female die and the male die.

For adaptation to the various given conditions of the material, the antechamber region is variable in size. The antechamber region serves as a reservoir for material. A first squish edge allows the recessing or bending of the shaped part, and at the same time extra material (decorative material and/or other material) can flow out of the antechamber region to prevent the tearing of the material.

Other features which are considered as characteristic for the invention are set forth in the appended claims.

Although the invention is illustrated and described herein as embodied in a tool for producing shaped parts with contours, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
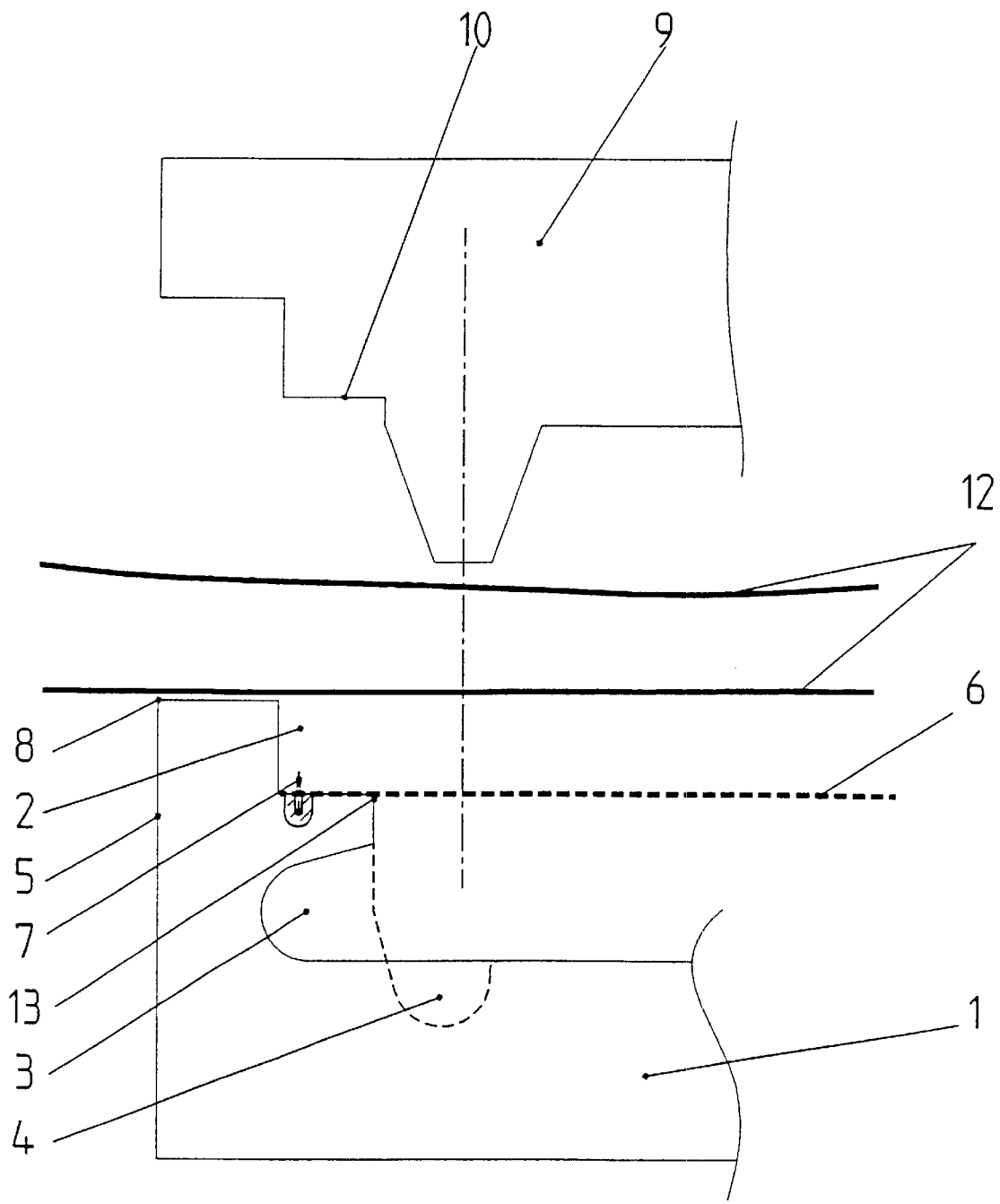
FIG. 1 is a diagrammatic, fragmentary, side-elevational view of a tool in an open position according to the invention.
Figure 2:
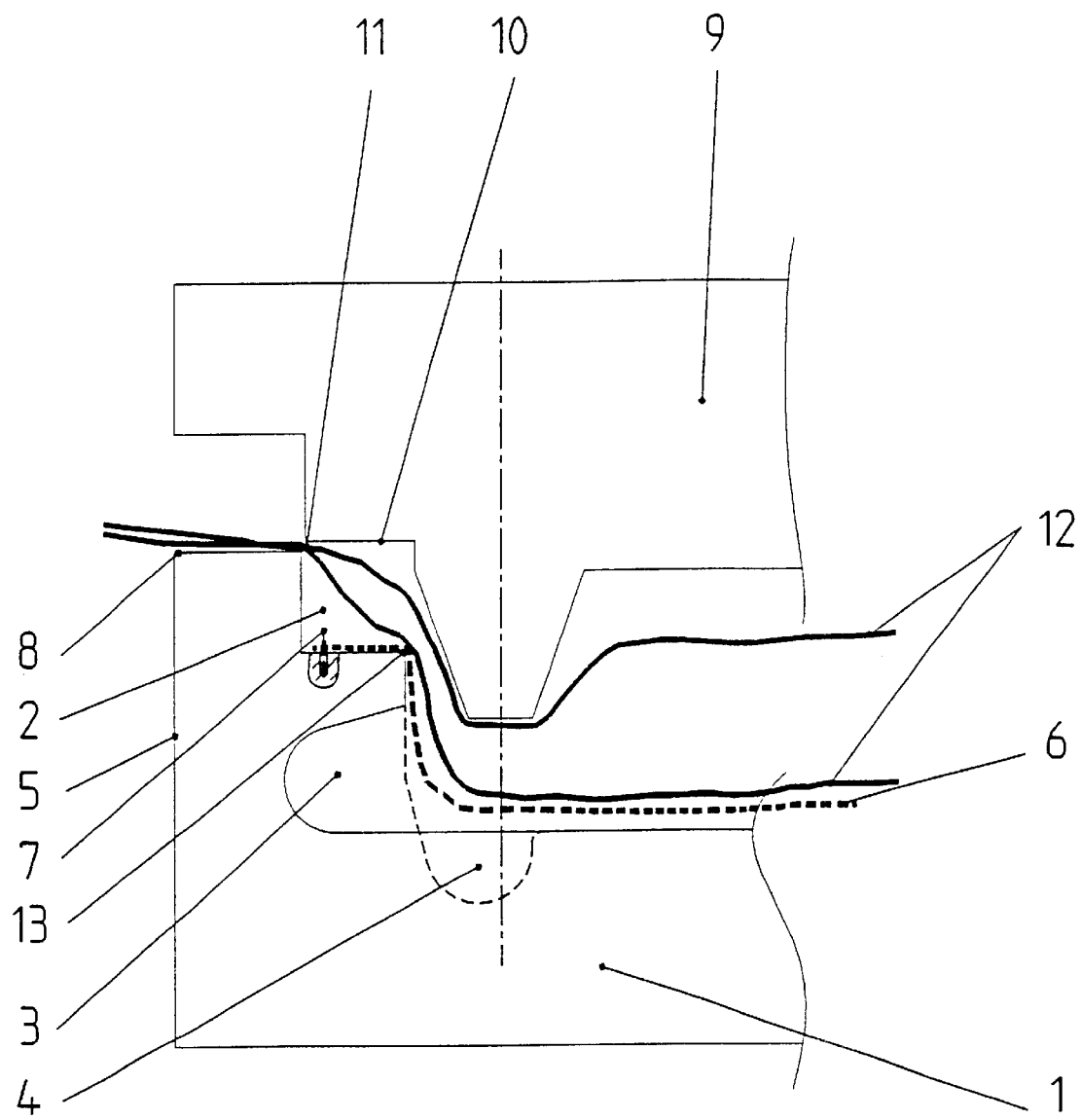
FIG. 2 is a fragmentary, side-elevational view in which the tool is in a half-closed state.
Figure 3:
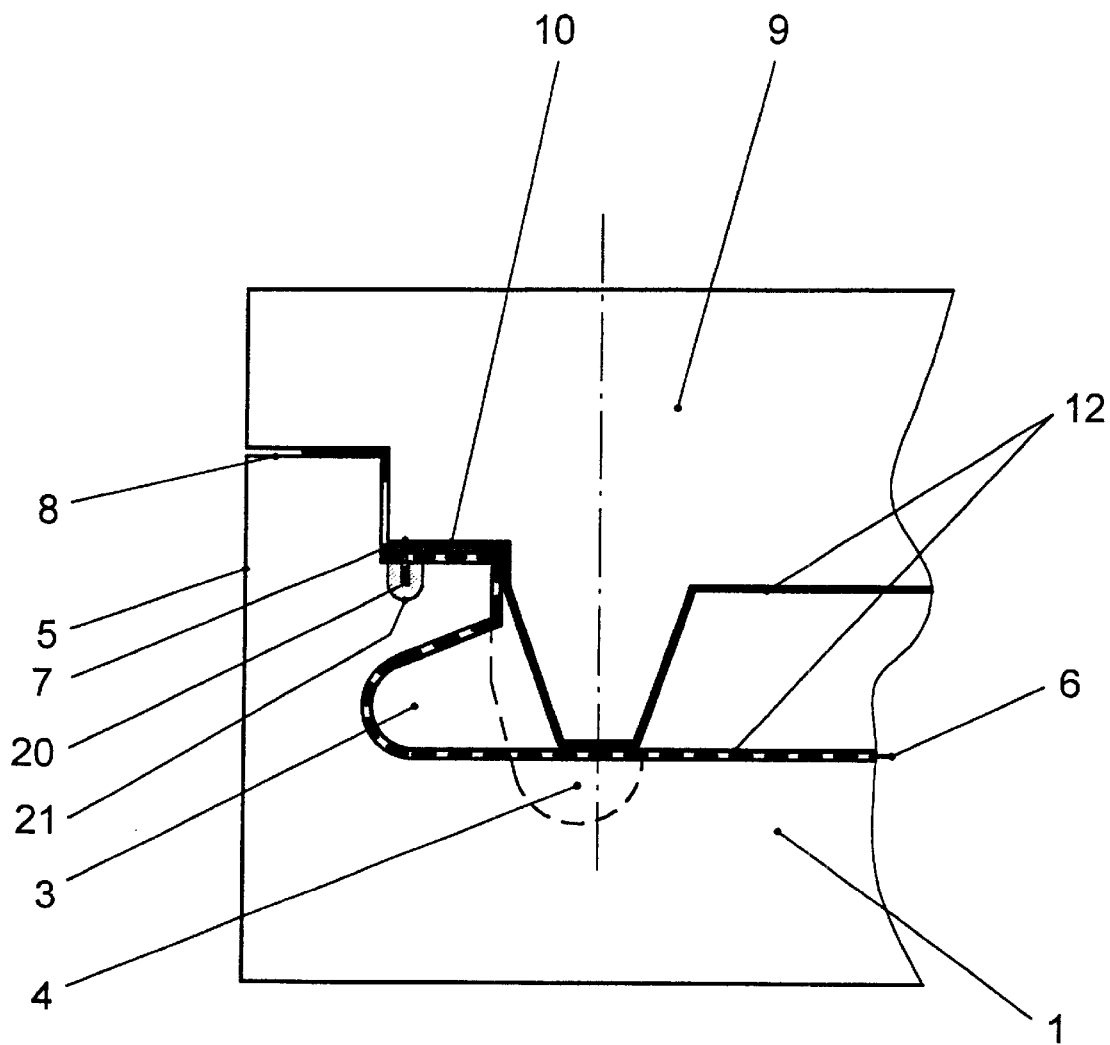
FIG. 3 is a fragmentary, side-elevational view in which the tool is in a closed state.

Referring now to the figures of the drawing in detail and first, particularly, to FIG. 1 thereof, there is shown a tool for producing shaped parts with contours which includes a female die 1 and a core or a male die 9 associated with it, between which a tube 12 or other deformable material is placed. The female die 1 has an antechamber region 2. The antechamber region 2 is bounded on one side at right angles to a face end 5 of the female die 1 and extends between an inlet region 8 of the female die 1 and an undercut 3, or a contour 4 shown in dashed lines. A retaining device 7 is used for the fixation of a decorative material 6. In the drawings, the retaining device 7 is shown in the form of a pin, which is disposed on a part of the antechamber region 2 pointing toward the face end 5 of the female die 1. The retaining device 7 may be guided movably in an arbitrary embodiment such as a compulsory guide 20 formed in the shape of a longitudinal groove 21 (see FIG. 3) extending entirely across the antechamber region 2. A compression spring 22 may be disposed in the longitudinal groove 21. The male die 9 has a pressure face 10 that can be driven into the antechamber region 2.

Between a beginning edge of the pressure face 10 and a beginning edge of the antechamber region 2, upon closure of the tool, a first squish edge 11 is formed for fixation of the tube 12. Due to the squish edge 11, a pressure and/or vacuum-proof tool cavity is achieved. As can be seen from FIG. 3, a second squish edge 13 is formed by further inward driving of the pressure face 10 into the female die 1.

Figure 4:
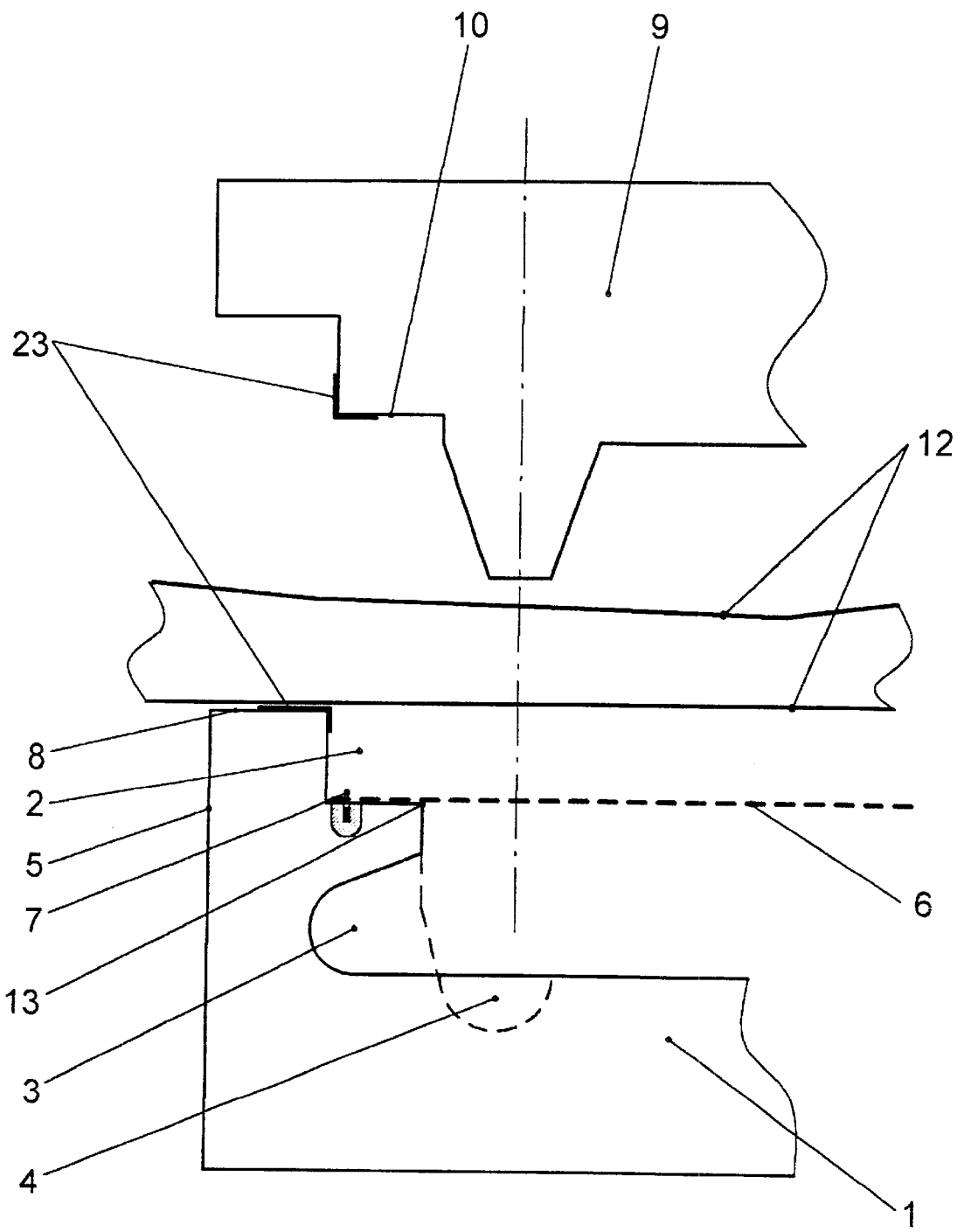
FIG. 4 is a fragmentary, side-elevational view showing interchangeable inserts on the tool.

FIG. 4 shows interchangeable inserts 23 being mounted on the male die 9 and the female die 1. The interchangeable inserts 23 are used to change the configuration and dimensions of the first and second squish edges 11, 13.

What is claimed is:

1. A tool for producing molded parts with contours from a parison of deformable material, comprising:

a female die; and a male die;

said male die and said female die to be respectively moved toward each other in an axial direction and between which is placed a parison of deformable material to be molded;

said female die having a cavity formed therein and a double-stepped mold region, said double-stepped mold region having a first female die edge, an antechamber region disposed from said first female die edge in said axial direction and in a direction toward said cavity, and a second female die edge bounding said antechamber region and disposed below said first female die edge in said axial direction, said double-stepped mold region forming an antechamber between said first female die edge and said second female die edge;

said male die having a first male die edge, a second male die edge, a male die pressure area bounded by said first male die edge and said second male die edge and corresponding to said antechamber region, and a double-stepped region engaging said double-stepped mold region for:

forming a first squish edge with said first female die edge and said first male die edge to fix the deformable material and to form at least one of a pressure-tight and vacuum-tight cavity in the deformable material when said female die and said male die are initially moved toward each other in said axial direction;

subsequently forming a second squish edge with said second female die edge and said second male die edge when said female die and said male die are moved further together; and securely holding the deformable material between said antechamber region and said male die pressure area upon closing said female die and said male die.

2. The tool according to claim 1, including a retaining device disposed in said antechamber for securing a decorative material.

3. The tool according to claim 2, wherein said antechamber region has a compulsory guide and said retaining device is guided in said compulsory guide.

4. The tool according to claim 2, wherein said retaining device is at least one pin.

5. The tool according to claim 2, wherein said retaining device is disposed on said antechamber region.

6. The tool according to claim 3, wherein said compulsory guide extends entirely over said antechamber region.

7. The tool according to claim 3, wherein said compulsory guide is a groove extending along said antechamber region.

8. The tool according to claim 3, wherein said retaining device is frictionally held within said compulsory guide.

9. The tool according to claim 7, including a compression spring disposed in said groove.

10. The tool according to claim 8, wherein a force required to overcome the friction holding said retaining device in said compulsory guide is less than a force required to tear the decorative material.

11. The tool according to claim 1, wherein said female die has an end face and said antechamber is bounded on one side perpendicular to said end face.

12. The tool according to claim 1, wherein said female die has a support and said double-stepped mold region recessively extends into said female die relative to said support.

13. The tool according to claim 1, wherein said male die pressure area is configured to be driven into said antechamber.

14. The tool according to claim 1, including inserts disposed on at least one of said female die and said male die for varying a configuration of at least one of said first squish edge and said second squish edge.

15. The tool according to claim 1, wherein said male die and said female die are to be moved jointly.

16. The tool according to claim 1, wherein said male die is fixed and said female die is to be moved.

17. The tool according to claim 1, wherein said male die is to be moved and said female die is fixed.

18. The tool according to claim 1, wherein said female die has an undercut.

* * * * *